C. SWAIN.
Baker's Oven.
No. 102,614. Patented May 3, 1870.
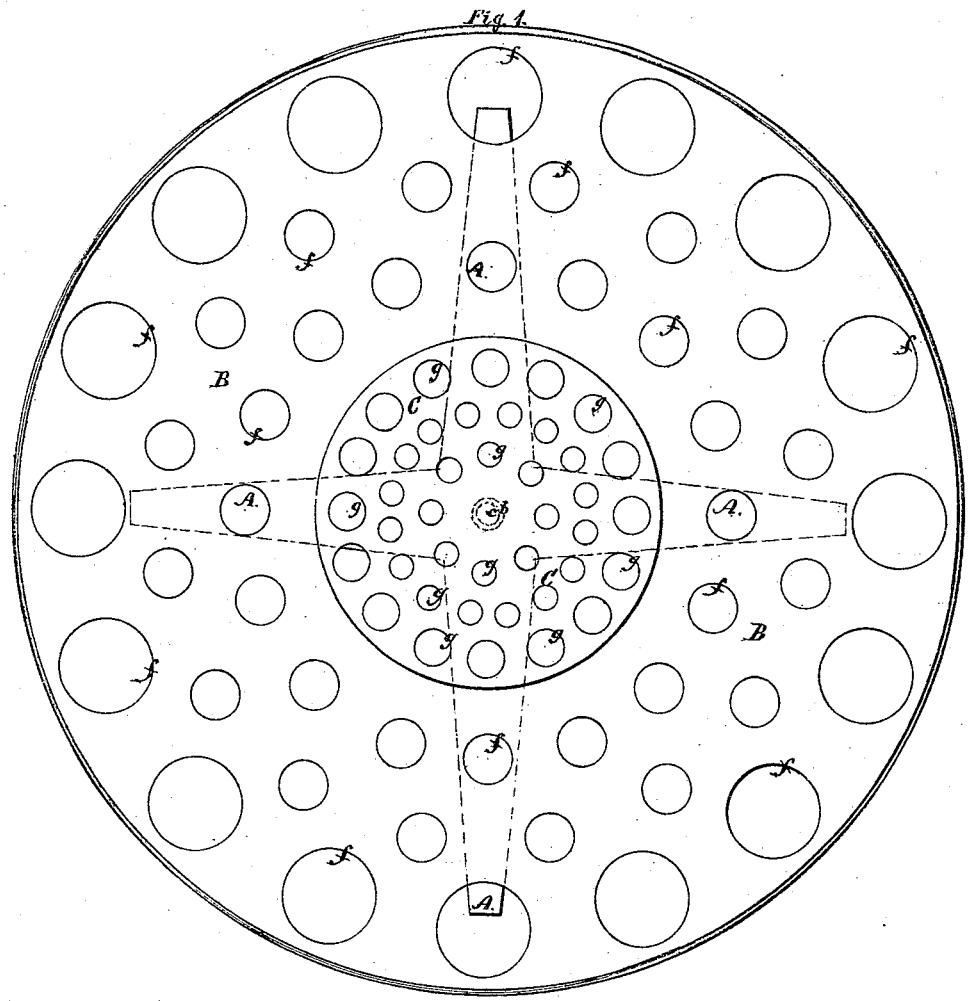
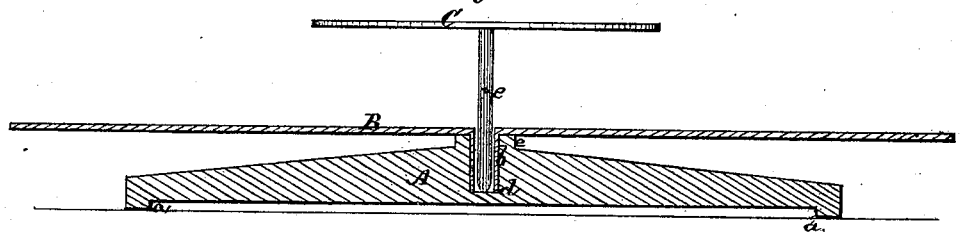

UNITED STATES PATENT OFFICE.

CHARLES SWAIN, OF LACONIA, NEW HAMPSHIRE.

OVEN.

Specification forming part of Letters Patent No. 102,614, dated May 3, 1870.

*To all whom it may concern:*

Be it known that I, CHARLES SWAIN, of Laconia, in the county of Belknap and State of New Hampshire, have invented an Improved Oven-Grate; and I do hereby declare that the following is a full and exact description thereof, reference being had to the accompanying drawings, making part of this specification.

Figure 1 is a top view of the grate; Fig. 2, a central vertical section thereof, one part being in elevation.

Like letters designate corresponding parts in both figures.

This invention consists, first, in a revolving grate, B, pivoted on a portable stand or base, A; and, second, in a smaller grate, C, raised above the center thereof, and having a separate revolving motion, or being stationary, while the lower grate revolves. The stand A is removable from the oven, and portable, so that it can be placed in or taken out of the oven at pleasure, or placed in different ovens. It may have feet $a$ $a$ to raise it to any desired height above the bottom of the oven. By means of this removable portable stand a revolving grate may be used in any oven, and does not require to be a fixture thereof, nor any special construction to fit any oven. The main revolving-grate B has a tubular pivot, $b$, which fits down and turns in a bearing, $d$, in the base or stand A. It may have any convenient form or construction. By it any articles, while baking, may be turned round or shifted in position in the oven with great facility, or brought to the door of the oven for removing therefrom. The smaller grate, C, serves to hold articles when the lower grate is full, or when it is desired to change the heat in baking particular articles or dishes. It may revolve on a pivot-support, $c$, or not, though I prefer to have it revolve, as indicated in the drawings. This pivot turns in the hollow or tubular pivot $b$ of the revolving grate B, and is supported in the bearing $d$ of the stand A. It also may have any desirable form or construction.

What I claim as my invention, and desire to secure by Letters Patent, is—

The combination and arrangement of the stand A, revolving grate B, and elevated grate C, constructed and operating substantially as and for the purposes herein specified.

This specification signed by me September 27, 1869.

CHARLES SWAIN.

Witnesses:
SILAS B. SMITH,
FRANK FRENCH.